(12) United States Patent
Dong et al.

(10) Patent No.: US 8,966,381 B2
(45) Date of Patent: Feb. 24, 2015

(54) TIME INTELLIGENCE FOR APPLICATION PROGRAMS

(75) Inventors: Randy Dong, Issaquah, WA (US); Rohan Shetty, Bellevue, WA (US); Rou-Peng Huang, Woodinville, WA (US); Peter Bull, Redmond, WA (US); Mark Yang, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1302 days.

(21) Appl. No.: 11/784,887

(22) Filed: Apr. 10, 2007

(65) Prior Publication Data

US 2008/0256122 A1  Oct. 16, 2008

(51) Int. Cl.
*G06F 3/00* (2006.01)

(52) U.S. Cl.
USPC ............................ 715/752; 715/736; 715/762

(58) Field of Classification Search
CPC ................................ G06F 3/048; G06F 3/0481
USPC ......................................... 715/963, 762, 752
See application file for complete search history.

(56) References Cited

U.S. PATENT DOCUMENTS

| 5,905,985 | A | 5/1999 | Malloy et al. |
| 6,493,728 | B1 * | 12/2002 | Berger .................................. 1/1 |
| 7,013,289 | B2 | 3/2006 | Horn et al. |
| 7,165,065 | B1 * | 1/2007 | Welton et al. ........................ 1/1 |
| 7,492,670 | B2 * | 2/2009 | Parees et al. .................... 368/29 |
| 2003/0154116 | A1 * | 8/2003 | Lofton .............................. 705/8 |
| 2004/0015713 | A1 | 1/2004 | Abe et al. |
| 2004/0193657 | A1 | 9/2004 | Saito et al. |
| 2005/0050064 | A1 | 3/2005 | Klein et al. |
| 2005/0094494 | A1 * | 5/2005 | Parees et al. .................... 368/29 |
| 2005/0278458 | A1 | 12/2005 | Berger et al. |
| 2006/0010155 | A1 * | 1/2006 | D'Hers et al. ................ 707/102 |
| 2006/0053136 | A1 * | 3/2006 | Ashiri .......................... 707/101 |
| 2006/0106799 | A1 | 5/2006 | Maijala et al. |
| 2006/0149778 | A1 * | 7/2006 | Clover ......................... 707/102 |
| 2006/0175392 | A1 * | 8/2006 | Schmidt et al. ............... 235/377 |
| 2006/0248203 | A1 | 11/2006 | Yamaoka et al. |
| 2006/0253475 | A1 | 11/2006 | Stewart et al. |
| 2007/0150471 | A1 * | 6/2007 | MacGregor ....................... 707/6 |
| 2008/0066067 | A1 * | 3/2008 | Stimpson et al. ............. 718/100 |

OTHER PUBLICATIONS

Colliat, George, "OLAP, Relational, and Multidimensional Database Systems", Date: Sep. 1996, vol. 25, No. 3, http://dimlab.usc.edu/csci599/Fall2003/paper/I2_P064.pdf.

McGrew, Mike, "SQL Server 2005 Enhances Performance of Data Warehouse for Microsoft IT Tax Group", Date: 2005, http://download.microsoft.com/documents/customerevidence/21474_Tax_Datawarehouse-a.doc.

* cited by examiner

*Primary Examiner* — Tuyetlien Tran
(74) *Attorney, Agent, or Firm* — Thomas Wong; Brian Haslam; Micky Minhas (57) ABSTRACT

Techniques to implement time intelligence for application program are described. An apparatus may include a calendar application module. The calendar application module may be arranged to define and generate a calendar for an application program, the calendar application module to define time members for a time dimension of a multidimensional data model, assign a monotonically increasing unique identifier to each time member, and generate the calendar with time members from the time dimension using the unique identifiers. Other embodiments are described and claimed.

20 Claims, 4 Drawing Sheets

RECEIVE DEFINITIONS FOR TIME MEMBERS FOR A TIME DIMENSION OF A MULTIDIMENSIONAL DATA MODEL
202

ASSIGN A MONOTONICALLY INCREASING UNIQUE IDENTIFIER TO EACH TIME MEMBER
204

GENERATE A CALENDAR WITH TIME MEMBERS FROM THE TIME DIMENSION USING THE UNIQUE IDENTIFIERS
206

TIME INTELLIGENCE FOR APPLICATION PROGRAMS

BACKGROUND

Many businesses typically need customized calendars for certain application programs, such as financial and accounting application programs. This has been previously accomplished by programming the specific type of calendar needed for a given application program directly into the application program itself, thereby leading to a proprietary calendar generator for each application program. Whenever an application program with a tightly integrated calendar requires a new type of calendar, or modifications to properties for an existing calendar, however, the calendar portion of the application program may need to be re-written for the application program. Further, the calendar for one program may not be transported to a different application program, or even an updated version of an existing application program in some cases. Consequently, techniques for improved calendar generation and management may be needed to solve these and other problems.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Various embodiments may be generally directed to a time intelligence techniques for application programs, such as business or financial application programs, for example. Some embodiments may be particularly directed to a calendar application program that may be used to create customized calendars for various types of application programs. The calendar application program may be implemented in the form of a calendar creation wizard, which may be arranged to present various calendar defining options to a calendar designer for a given application program. The calendar application program may generate and manage a calendar for a given application program based on the calendar definitions. In the event a calendar needs to be modified, updated or replaced, the calendar creation wizard may be used to make the desired modifications, updates or replacements. The calendar application program may support various use scenarios, including creating a calendar during application creation, creating a calendar after application creation, associating a calendar with a model, associating a calendar with a work process, and other calendar based use scenarios.

In one embodiment, for example, an apparatus may include a calendar application module. The calendar application module may be arranged to define and generate a calendar for an application program. In particular, the calendar application module may be used to define time members for a time dimension of a multidimensional data model. The calendar application module may assign a monotonically increasing unique identifier to each time member, and generate the calendar with time members from the time dimension using the unique identifiers. Other embodiments are described and claimed.

DETAILED DESCRIPTION

Various embodiments may comprise one or more elements. An element may comprise any feature, characteristic, structure or operation described in connection with an embodiment. Examples of elements may include hardware elements, software elements, physical elements, or any combination thereof. Although an embodiment may be described with a limited number of elements in a certain arrangement by way of example, the embodiment may include more or less elements in alternate arrangements as desired for a given implementation. It is worthy to note that any references to "one embodiment" or "an embodiment" are not necessarily referring to the same embodiment.

Various embodiments are directed to a calendar application module. The calendar application module may provide an overall framework for generating and managing various time members of a time dimension for a business model. Time dimension is vital to the organization of many business models, as well as the multidimensional database and data cube itself. The calendar application module may receive user input, construct a time dimension, and build a data cube for a given business model. The user input comes in the form of broad rules from which the application program determines the layout of the calendar and its division into user-selected time periods. User input also clusters these time periods together which are then mapped to a time dimension as leveled hierarchies. The calendar application module may also provide additional functionality, such as provide responses to queries about calendar data, support editing and regeneration of the time dimension, support multiple calendar views, provide the capability for adding or removing views to and from a given model, provide sufficient robustness to handle a wide range of possible calendars and calendar types, and so forth.

More particularly, the calendar application module may generate and manage various calendar objects corresponding to framework meta-data for a calendar. For example, a multidimensional database may employ a multidimensional data model that is used to form a multidimensional data cube. One example of a multidimensional database may comprise an online analytical processing (OLAP) database. The multidimensional data cube may have multiple cells, with each cell holding a certain type of data or information. Time dimension information may be defined for each cell of the data cube. The calendar application module may generate time dimension information or meta-data for each cell based on a set of rules or methods. For example, assume data representing profit figures for Mar. 16, 1997 is stored in a single cell of the multidimensional data cube. The meta-data for this cell would include all of the time dimensional data about this day, such as the fact that it is one of the members of the time dimension and its quarter column has a value of "Q1-1997" and its year column has a value of "1997." The framework meta-data would include rules and objects used for generating the time dimension members. Calendar objects are therefore are part of the framework meta-data.

Figure 1:
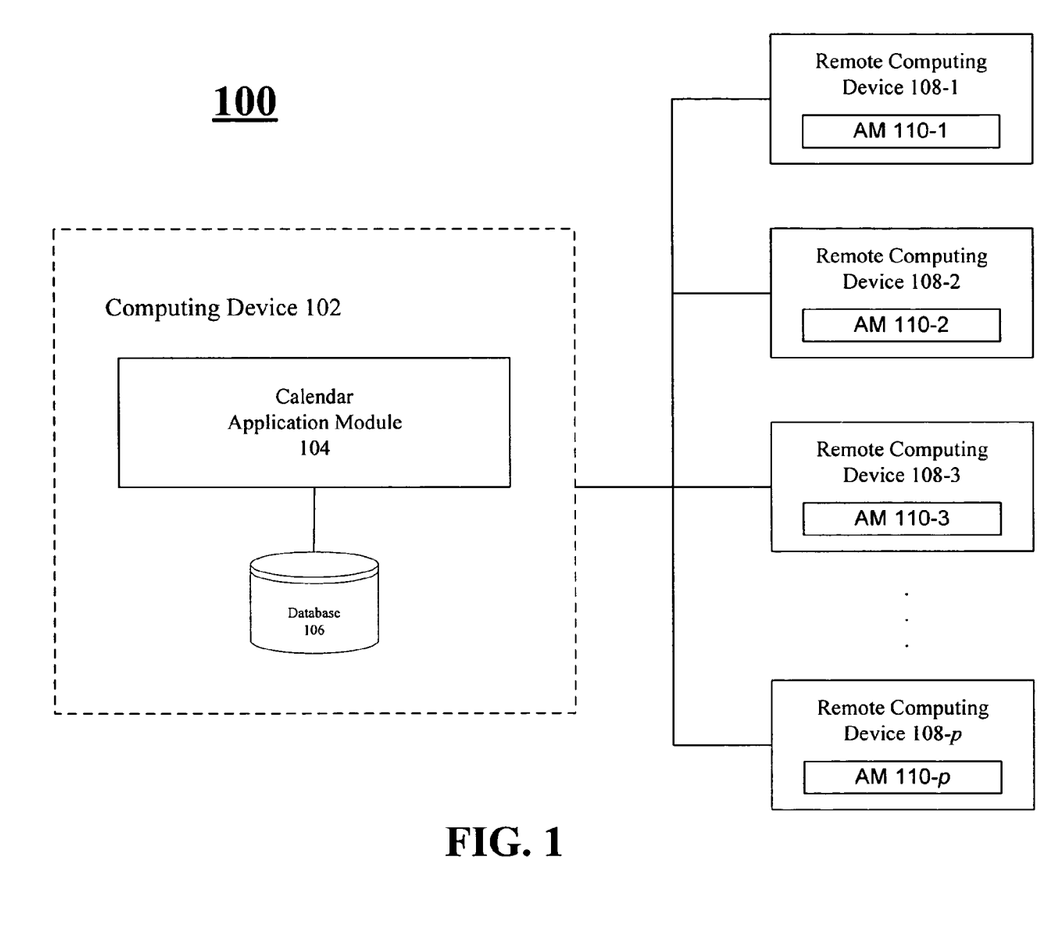
FIG. 1 illustrates one embodiment of business application system.

FIG. 1 illustrates a block diagram of a business application system 100. The business application system 100 may represent any system arranged to store, process, communicate, and otherwise manage calendar application processes or operations for an electronic system or collection of electronic systems. As shown in FIG. 1, one embodiment of the business application system 100 may include a computing device 102 coupled to one or more remote computing devices 108-1-$p$, where p represents a positive integer value. Computing device 102 may comprise a calendar application module 104 coupled to a database 106. Each of remote computing devices 108-1-$p$ may include a respective application module 110-1-$p$. In some cases, the modules 104, 110 may be the same or similar modules. In other cases, the modules 104, 110 may be arranged as client-server applications or peer-to-peer applications as desired for a given implementation. Additional details for one embodiment of computing device 102 and remote computing devices 108-1-$p$ may be further illustrated and described with reference to FIG. 4.

As used herein the term "module" may include any structure implemented using hardware elements, software elements, or a combination of hardware and software elements. In one embodiment, for example, the modules described herein are typically implemented as software elements stored in memory and executed by a processor to perform certain defined operations. It may be appreciated that the defined operations, however, may be implemented using more or less modules as desired for a given implementation. It may be further appreciated that the defined operations may be implemented using hardware elements based on various design and performance constraints. The embodiments are not limited in this context.

In various embodiments, the business application system 100 may be used to create, collect, display and otherwise manage calendar information or data for various types of application programs or systems. With respect to computing device 102 and/or remote computing devices 108-1-$p$, the calendar information may be stored and accessed via any number of memory units, storage media, machine readable media, or computer-readable media implemented for a given computing device, such as database 106 shown with computing device 102, for example. Computing device 102 and remote computing devices 108-1-$p$ may represent any type of electronic device having the appropriate hardware, software or combination hardware and software arranged to execute the operations of calendar application module 104 and/or application modules 110-1-$p$. Examples of computing device 102 and remote computing devices 108-1-$p$ may be described in more detail with reference to FIG. 4.

In various embodiments, the computing device 102 may be implemented as a server or cluster of servers. In one embodiment, for example, the computing device 102 may be implemented as a MICROSOFT® OFFICE PERFORMANCEPOINT™ SERVER, Microsoft Corporation, Redmond, Wash. A PerformancePoint Server may comprise a suite of applications, servers, services and tools to manage business information relating to business finances, business management, sales, marketing, manufacturing, human resources, planning, and so forth. A PerformancePoint Server may provide the infrastructure between a PerformancePoint Server client-tier, the PerformancePoint Server (SQL) databases, and other services or endpoints. Although some embodiments may be described in the context of PerformancePoint Servers by way of example, it may be appreciated that various embodiments may be implemented for other computing devices as desired for a given implementation. The embodiments are not limited in this context.

In various embodiments, the remote computing devices 108-1-$p$ may be implemented as client computers for the computing device 102. In one embodiment, for example, the remote computing devices 108-1-$p$ may be implemented as PerformancePoint Server clients. In addition to having the appropriate applications, services and tools to operate as PerformancePoint Server clients, the remote computing devices 108-1-$p$ may include application modules 110-1-$p$. The application modules 110-1-$p$ may represent application programs suitable for use or interoperability with the calendar application module 104 as described with reference to the computing device 102. In one embodiment, the application modules 110-1-$p$ may be implemented as an application program from the MICROSOFT OFFICE suite of application programs, financial programs, accounting programs, project management programs, and any other type of application program utilizing a calendar for some of its data.

In various embodiments, the computing device 102 of the business application system 100 may include a database 106. In one embodiment, for example, the database 106 may comprise an enterprise database for a business entity or business model. Further, the database 106 may include calendar information for a business entity or business model. The information maintained by the database 106, however, is not necessarily limited by the examples given herein.

In one embodiment, for example, the database 106 may comprise a multidimensional database. More particularly, the database 106 may comprise an OLAP database employing a multidimensional data model, thereby allowing for complex analytical and ad-hoc queries with a relatively fast response time. The database 106 may manage an OLAP data cube, which is a conceptual representation of a database which can be implemented in a variety of ways, including top-down, bottom-up, and arrays.

In various embodiments, the OLAP database 106 may include a type library to build various types of models, such as a business model. A business model may comprise a basic unit of data storage in the business application system 100. A business model defines how data from various operational systems are processed, calculated and viewed. A business model may include dimensions and hierarchies, predefined application intelligence, forms, reports, model maps, calculations, processes, business rules, business logic, and so forth. A business model assists in integrating disparate but relevant information about a business entity such as a company into a tangible perspective that can be used to accurately measure such characteristics as performance, plan, budget, forecast, and so forth.

In various embodiments, the OLAP database 106 may implement a multidimensional data model. Multidimensional databases often contain various dimensions. A dimension may represent a fundamental building block to define a metadata structure for a business model. A dimension is an organized hierarchy of categories, or members, that describe data in a fact table. These categories typically describe a similar set of elements. For example, a "Geography" dimension may include Country, Region, State, City or Province. Each dimension is typically made of members. A member represents a specific instance of a characteristic described by a dimension. For example, "Black Roller Pen" could be a member of a "Product" dimension. If a member is calculated, a formula is associated with the member. A property is a characteristic of a dimension member. For example, a characteristic "Color" could be a property of the dimension member "Product." Properties can be system-designed or user-designed. A hierarchy is a structured organization of dimension members. Hierarchies are typically defined by dimension members, levels, and parent-child relationships. In one embodiment, for example, the OLAP database 106 may implement a multidimensional data model having a time dimension.

In various embodiments, the computing device 102 of the business application system 100 may include a calendar application module 104. The calendar application module 104 may comprise part of another program (e.g., such as an application program or system program), may comprise part of a library of programs, or may comprise a standalone product. In one embodiment, for example, the calendar application module 104 may be implemented as part of the PerformancePoint Server architecture, such as part of a PerformancePoint Planning Business Modeler. The embodiments are not limited, however, to this example.

In various embodiments, the calendar application module 104 may be arranged to define and generate a calendar for an application program, such as one or more application programs 110-1-p of remote computing devices 108-1-p. The calendar application module 104 may define time members for a time dimension of a multidimensional data model, such as employed by the OLAP database 106. The calendar application module 104 may assign a monotonically increasing unique identifier to each time member. The calendar application module 104 may generate a calendar with time members from the time dimension using the unique identifiers. In this manner, the calendar application module 104 may allow a user to create a time dimension which has meaning from a time/calendar perspective as opposed to simply a collection of members in a dimension.

In one embodiment, for example, the calendar application module 104 may assign a monotonically increasing unique identifier to each time member. Functions between ordered sets are considered to be monotonic (or monotone) if they preserve the given order. The unique identifier may have the property either of never increasing or never decreasing as the values of the independent variable or the subscripts of the time member increase. For example, the calendar application module 104 may assign a unique identifier to each time member, or if organized in a hierarchical manner then to each hierarchical level of the hierarchy, in a manner that preserves the given order of the unique identifiers and/or time members even when certain functions or operations are performed on or using the unique identifiers, such as any framework metadata operations as previously described.

In various embodiments, the calendar application module 104 may implement a calendar object model with various top level objects. In one embodiment, for example, the calendar application module 104 may implement three main classes in the calendar object model, including a calendar object, a frequency object, and a view object. The calendar object may comprise the container class for all the frequency and view objects. Every calendar object has a frequency instance that corresponds to the day frequency and one that corresponds to the year frequency. The calendar object may have more frequencies corresponding to the week, quarter, trimester, semi-annual, and so forth. Every calendar object also has view instances. A view instance may comprise an ordered list of frequencies. For example, for a five year calendar the calendar class will have a frequency instance called "Day" that has 5*(Number of days per calendar) members, and one called "Year Frequency" that has 5 members. A view instance for this calendar may be an ordered list of "Day-Week-Quarter-Year." There may be other views.

In various embodiments, the calendar application module 104 may have a various classes. In one embodiment, for example, the calendar application module 104 may have a calendar class and a calendar builder class. The calendar class is the container class for the calendar application module 104. The calendar builder class creates the calendar based on user input. Different types of calendars can be created based on various business scenarios. The type of calendar governs the rules for the number of days in the calendar year. The user is also provided with advanced options such as what day of the week is required to be the starting day of the calendar or defining the minimum length of the first week. Every calendar has two required frequency instances, such as the "Day Frequency" and the "Year Frequency," for example.

In one implementation, for example, a business use scenario may call for the "Day Frequency" as the minimum granularity and is therefore the lowest (and required) frequency of every calendar. Also the concept of the calendar year is typically applicable to many business use scenarios. When the user defines a calendar based on various available options, the calendar application module 104 may create the calendar and its day and year members. Every calendar typically includes various frequencies and views.

In various embodiments, the calendar application module 104 may be arranged to select calendar frequencies for the calendar. The calendar application module 104 may include a frequency class. Frequencies are the foundation for the calendar framework. Each instance of a frequency contains the methods needed for generating all instances of a single time period. For instance, one instance of the "Gregorian Month" class is used to generate the data for all the Gregorian months of the calendar. Frequencies such as "Gregorian Year," "Gregorian Month," and "Gregorian Day" may be predefined since: (a) these time periods would be difficult to express without using Gregorian calendar functions; and (b) all other time periods may be defined in terms of patterns of these unit frequencies. Thus, a "Generic Frequencies" class may be used to encapsulate all other time periods and is defined in terms of other frequencies. Although the Generic Frequencies class will be used to represent all user defined frequencies, the calendar application module 104 may also provide several instances of predefined generic frequencies such as 10-day period, Quarter, Trimester, Semester, and 445 patterns. The order in which the frequencies appear in a calendar list typically determines their hierarchy.

In various embodiments, the calendar application module 104 may be used to create calendar views for the calendar in the time dimension. The calendar application module 104 may include a view class. Each view is essentially a representation of a calendar that only chooses to display certain frequencies. Therefore, a view typically contains a reference to a calendar and filtering information for specifying which frequencies to display. Each view is thus a different coordinate system for specifying dates as well.

In various embodiments, the calendar application module 104 may include a calendar builder class. The calendar builder class operates similar to a calendar factory. It creates the calendar object depending on what type of calendar needs to be created. The calendar builder class also creates the used and available frequency lists. It populates all the end markers for the frequencies, and initializes the end values to the end markers. It further sets the essential properties for the calendar, such as weekend, start week length properties, and so forth.

In various embodiments, the calendar application module 104 may include a time manager and calendar helper class. The time manager and calendar helper class operates as an interface to clients utilizing the calendar application module 104, such as one or more of the application modules 110-1-p of the remote computing devices 108-1-p, for example. The time manager and calendar helper class may contain several static methods that perform operations on the calendar objects. For example, this class may include a generate time dimension method to generate the time members of the time dimension and create dimension attributes.

The calendar may translate to a business dimension or business model, and the time dimension is used by the business model and consequently becomes one of the axes of the cube. Every frequency of the calendar is stored as a business dimension attribute. The end values of the day frequency become the business members of the business dimension. The end values of other frequencies become the values of their respective business dimension attributes.

For example, assume a relatively basic calendar where a user defines a three year Gregorian calendar that begins on the first of January 2003 and ends on Dec. 31, 2005. The basic calendar might have five frequencies associated with it, such as Day, Week, Month, Quarter, Trimester and Year. Once the various calendar parameters have been defined, the calendar application module 104 may generate a calendar with the defined calendar and frequency instances, where the frequency instances have end markers, and the end values are governed by certain naming conventions, as follows:

Calendar=>freqList that contains Day, Week, Month, Quarter and Year.

Day endMarkers 1/1/2003, 1/2/2003, 1/3/2003 . . . . 12/31/2005

Week endMarkers 1/1/2003, 1/8/2003 . . . . 12/24/2005

Month endMarkers 1/1/2003, 2/1/2003 . . . . 12/1/2005

Quarter endMarkers 1/1/2003, 4/1/2003 . . . . 10/1/2005

TriMester endMarkers 1/1/2003, 5/1/2003 . . . . 9/1/2005

Year endMarkers 1/1/2003, 1/1/2004, 1/1/2005

With these example parameters, a time dimension for the calendar may be illustrated in Table 1 as follows:

TABLE 1

|  | Week | Month | Quarter | Trimester | Year |
|---|---|---|---|---|---|
| Jan. 1, 2003 | Week 1 | Month1 | Quarter1 | Trimester1 | Year1 |
| Jan. 8, 2003 | Week 2 | Month1 | Quarter1 | Trimester1 | Year1 |
| . . . |  |  |  |  |  |
| Dec. 31, 2005 | Week 52 | Month12 | Quarter4 | Trimester3 | Year3 |

As shown in Table 1, the columns correspond to the business dimension attribute. It is worthy to note that this is not an exact projection of the business dimension. The business dimension may use other members and properties. For example, "Week52" could also be "Week4" depending on how the user chose to number the frequency instance.

Continuing with this example, the calendar application module 104 may generate a calendar using various rules or framework meta-data. For example, if a calendar has the is New property set, then the calendar application module 104 may create a business dimension attribute for every frequency except Day. The calendar application module 104 may create the members using the endValues array of the Day frequency. The calendar application module 104 may traverse the endMarkers and obtain endValues for the corresponding endMarkers, and set the values of its corresponding business dimension attribute with the endValues. Once this is done we the is Dirty, is New and is Extend variables are set to FALSE.

If a calendar has the is Dirty property set, then it means that new frequencies may have been added or new views may have been created. It may also mean that a naming convention for an already existing frequency may have been altered. For example, what previously was a week frequency with numbering restarting every month is now a week frequency with numbering restarting every quarter. This means all the members for the business dimension attribute corresponding to this frequency will have to be regenerated. Consequently, the calendar application module 104 may traverse all of the frequencies of the calendar. For every frequency that has is New set, the calendar application module 104 creates a business dimension attribute. For every frequency that has is New or is Dirty set, the calendar application module 104 generates values for its particular dimension attribute. Once this is done, the calendar application module 104 may sets the is Dirty to FALSE for the calendar and its frequencies.

If a calendar has the is Extend property set, then it means that members have been added to the calendar. The calendar application module 104 needs to generate such members. The calendar application module 104 traverses every frequency and its extendMarkers. The variable is Extend will typically be set for each of these. The calendar application module 104 obtains endValues for these extendMarkers and sets values for the frequency's corresponding business dimension attribute with the endValues. The calendar application module 104 understands that at this point no frequencies have been modified or new frequencies have been added. Once this is done, the calendar application module 104 clears the extendMarkers and sets the is Extend to FALSE for the calendar and its frequencies. A function Generatetimedimension also creates a BizLevelledhiearchy for each view in the calendar. The structure and operations for the computing device 102 in general, and the calendar application module 104 in particular, may be further described with reference to FIGS. 2-4.

Operations for the business application system 100 may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more elements of the business application system 100 or alternative elements as desired for a given set of design and performance constraints.

Figure 2:
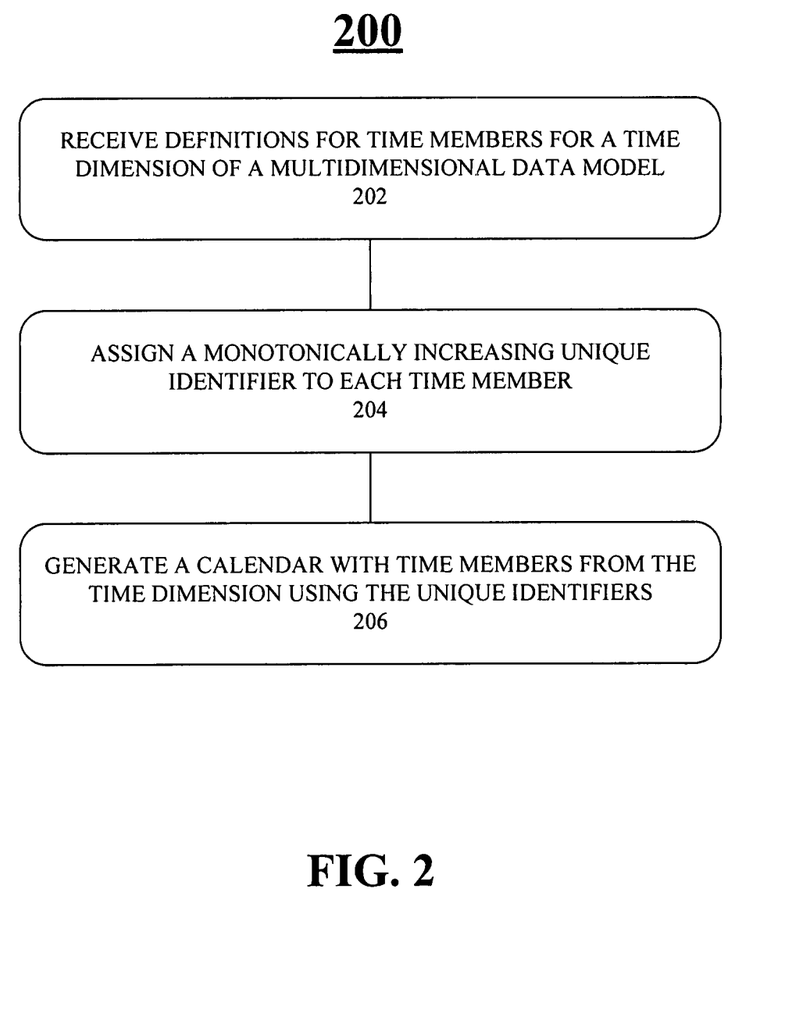
FIG. 2 illustrates one embodiment of a first logic flow.

FIG. 2 illustrates a logic flow 200. The logic flow 200 may be representative of the operations executed by one or more embodiments described herein. As shown in FIG. 2, the logic flow 200 may receive definitions for time members for a time dimension of a multidimensional data model at block 202. The logic flow 200 may assign a monotonically increasing unique identifier to each time member at block 204. The logic flow 200 may generate a calendar with time members from the time dimension using the unique identifiers at block 206. The embodiments are not limited in this context.

Figure 3:
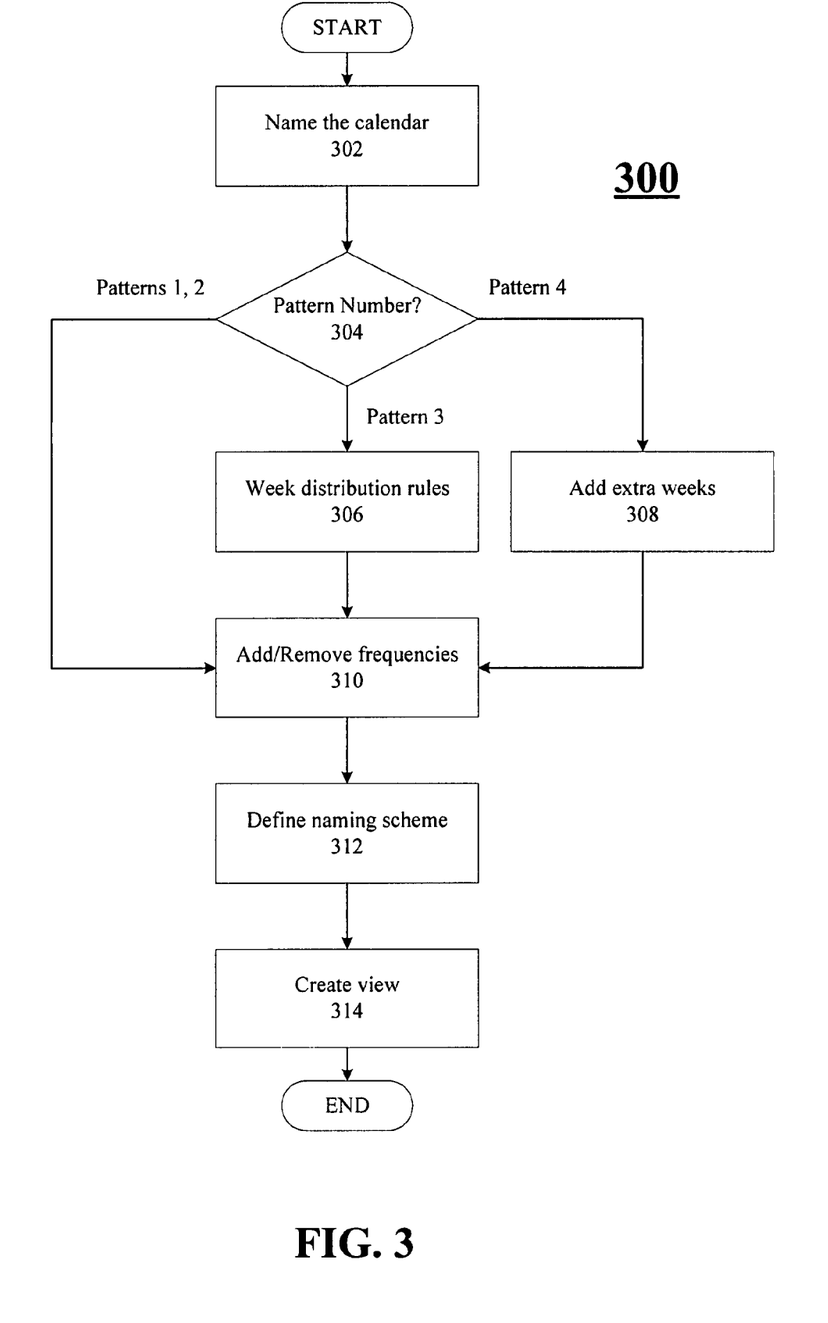
FIG. 3 illustrates one embodiment of a second logic flow.

FIG. 3 illustrates a logic flow 300. The logic flow 300 may be representative of the operations executed by one or more embodiments described herein. As shown in FIG. 3, the logic flow 300 may provide a user interface or graphic user interface to allow a user to name the calendar at block 302. Examples of calendar names may include "Fiscal Calendar," "Financial Reporting Calendar," and so forth. The logic flow 300 may then allow a user to select or define a calendar pattern at diamond 304. Examples of calendar patterns may include: (1) a Gregorian pattern; (2) a Fixed Month End pattern; (3) a Fixed Year pattern; and (4) a Varying Year pattern.

By way of example, a calendar pattern may include various definitions or parameters, as follows:

Current Year End: December 31 of the current year

Year End Options: Option 1 The year always ends on this day

Monthly Period Options: Option 1, Monthly periods correspond to the calendar month In one embodiment, for example, there are four possible choices that may be represented by radio buttons of a GUI view. A first radio button may represent "Monthly periods correspond to the calendar months" and a second radio button may represent "Monthly periods end on day X of every calendar month", referred to as respective patterns 1, 2 as shown in FIG. 3. The GUI may also include a third radio button that represents "Monthly period follows the pattern 445" and a fourth radio button that represents "The year end varies," referred to as respective patterns 3, 4 as shown in FIG. 3. The GUI may also include a "Current Year End" control as a date picker. If the "Current Year End" is set to the last day of a month, then the first of the monthly period options ("Correspond to the calendar months") is enabled, and the second of the monthly period options ("End on day "X" of every calendar period") is disabled. If the "Current Year End" is not set to the last day of a month, then the first of the monthly period options ("Correspond to the calendar months") is disabled, the second of the monthly period options ("End on day "X" of every calendar period") is enabled, and the text "X" is set to the same day of the month as selected for the "Current Year End."

If a user selects patterns 1 or 2 at the diamond 304, then the calendar creation wizard will display a GUI view for adding or removing frequencies at block 310. A required frequencies list is displayed only, and the user cannot interact with this list. Clicking on a "Create new frequency . . ." link advances the wizard to the first page of the "Create a new frequency" branch of the wizard.

If a user selects pattern 3 at diamond 304, then the calendar creation wizard will display a GUI view for defining week distribution rules for the calendar at block 306. The default values may be set as follows:

Weeks end on: Saturday
First Week must: Option 1, Day of Week dropdown defaults to same day selected in "Weeks end on"
Min # of days: 4
Exception: Fist date within 15/16 days of the calendar start that matches the day of week specified in "Weeks end on"

When a fixed year end is selected and months follow a pattern (such as 445 and so forth), rules need to be established to determine how weeks should be distributed. The logic flow 300 then passes control to block 310.

If a user selects pattern 4 at diamond 304, then the calendar creation wizard will display a GUI view for defining week distribution rules for the calendar at block 308. For calendars defined with a variable year end, extra weeks may need to be inserted to bring the calendar into alignment with the Gregorian calendar. Scroll buttons can be implemented to allow a user to scroll beyond the current year. For each year that the user scrolls to, an extra week can be inserted into one of the twelve available periods. Selecting "(none)" in the extra week dropdown removes the extra week for the year displayed. The logic flow 300 then passes control to block 310.

As shown in FIG. 3, the logic flow 300 may display a GUI view for defining naming schemes for the frequency members or instances of the calendar at block 312. A "Define Naming Scheme" page may present a list of all frequencies contained in the calendar. Selecting a frequency in the list presents options for defining the naming convention for each member of that frequency. Depending on the frequency type, the naming options change.

The naming rules for each frequency must be validated to avoid collisions with naming conventions for other calendars in the application. Each frequency period should be uniquely identified. For example, using a generic identifier such as "W1," "W2," "W3," and so forth would be insufficient because such identifiers would not indicate any context information that could be inferred from such an identifier, such as year, quarter, month, and so forth. When the user clicks on a different frequency, the wizard should validate that the name is appropriate and pop-up an error message if needed. Validation operations should also occur when the "Next" button is clicked.

As shown in FIG. 3, the logic flow 300 may display a GUI view for defining calendar views for the calendar at block 314. Calendar views are used in models to define how data should be analyzed and reported. Several views may be automatically created based on the frequencies that have been defined for a given calendar. The frequencies included in an automatically generated calendar view may be edited, or new calendar views may be created.

In one embodiment, for example, the first view listed is selected by default. Each view generated by the calendar application module 104 will be generically named, such as View1, View2, and so forth. By default, the description will be a concatenation of each frequency included in the view. By default the minimum number of calendar views will be created to ensure that each frequency contained by the calendar is represented in a view. Because frequencies that do not align cannot be combined in a view, more than one view may be required. This does not necessarily mean that a separate view will be generated for each possible permutation of frequencies.

Figure 4:
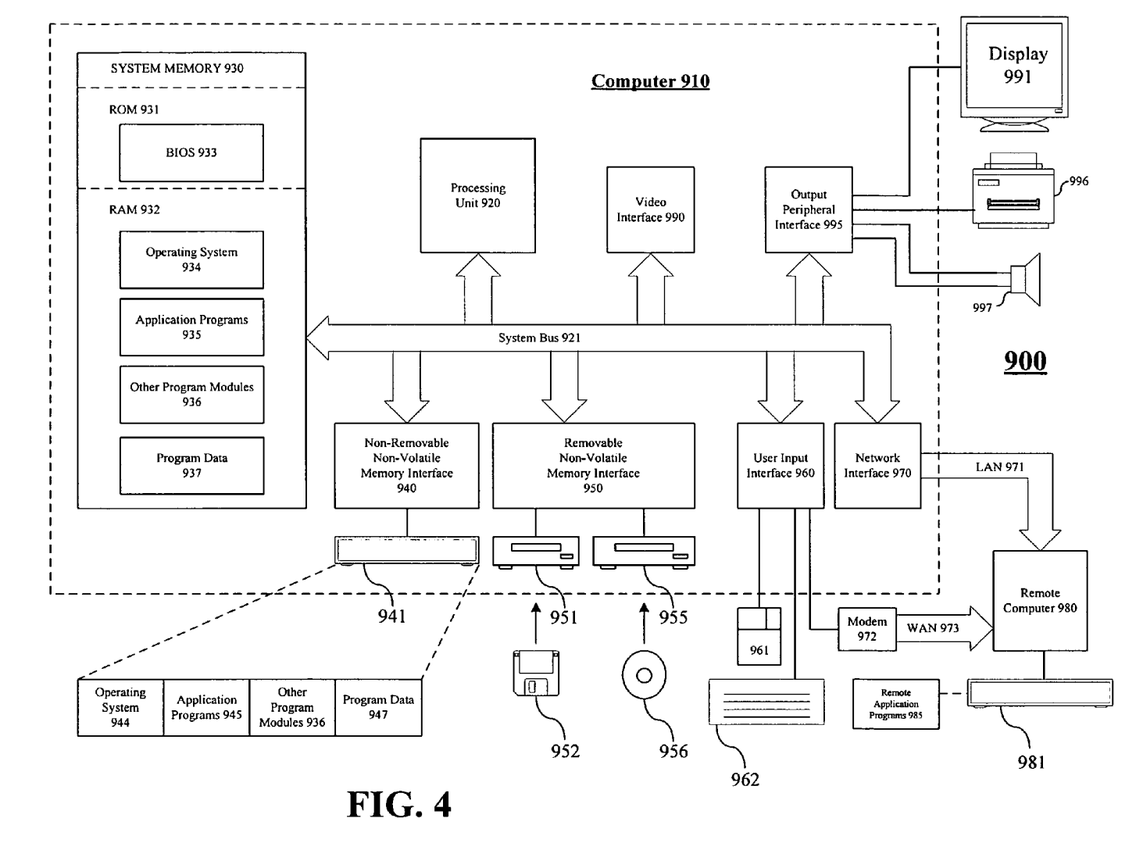
FIG. 4 illustrates one embodiment of a computing system architecture.

FIG. 4 illustrates a block diagram of a computing system architecture 900 suitable for implementing various embodiments, including the business application system 100. It may be appreciated that the computing system architecture 900 is only one example of a suitable computing environment and is not intended to suggest any limitation as to the scope of use or functionality of the embodiments. Neither should the computing system architecture 900 be interpreted as having any dependency or requirement relating to any one or combination of components illustrated in the exemplary computing system architecture 900.

Various embodiments may be described in the general context of computer-executable instructions, such as program modules, being executed by a computer. Generally, program modules include any software element arranged to perform particular operations or implement particular abstract data types. Some embodiments may also be practiced in distributed computing environments where operations are performed by one or more remote processing devices that are linked through a communications network. In a distributed computing environment, program modules may be located in both local and remote computer storage media including memory storage devices.

As shown in FIG. 4, the computing system architecture 900 includes a general purpose computing device such as a computer 910. The computer 910 may include various components typically found in a computer or processing system. Some illustrative components of computer 910 may include, but are not limited to, a processing unit 920 and a memory unit 930.

In one embodiment, for example, the computer 910 may include one or more processing units 920. A processing unit 920 may comprise any hardware element or software element arranged to process information or data. Some examples of the processing unit 920 may include, without limitation, a complex instruction set computer (CISC) microprocessor, a reduced instruction set computing (RISC) microprocessor, a very long instruction word (VLIW) microprocessor, a processor implementing a combination of instruction sets, or other processor device. In one embodiment, for example, the processing unit 920 may be implemented as a general purpose processor. Alternatively, the processing unit 920 may be implemented as a dedicated processor, such as a controller, microcontroller, embedded processor, a digital signal processor (DSP), a network processor, a media processor, an input/output (I/O) processor, a media access control (MAC) processor, a radio baseband processor, a field programmable gate array (FPGA), a programmable logic device (PLD), an application specific integrated circuit (ASIC), and so forth. The embodiments are not limited in this context.

In one embodiment, for example, the computer 910 may include one or more memory units 930 coupled to the processing unit 920. A memory unit 930 may be any hardware element arranged to store information or data. Some examples of memory units may include, without limitation, random-access memory (RAM), dynamic RAM (DRAM), Double-Data-Rate DRAM (DDRAM), synchronous DRAM (SDRAM), static RAM (SRAM), read-only memory (ROM), programmable ROM (PROM), erasable programmable ROM (EPROM), EEPROM, Compact Disk ROM (CD-ROM), Compact Disk Recordable (CD-R), Compact Disk Rewriteable (CD-RW), flash memory (e.g., NOR or NAND flash memory), content addressable memory (CAM), polymer memory (e.g., ferroelectric polymer memory), phase-change memory (e.g., ovonic memory), ferroelectric memory, silicon-oxide-nitride-oxide-silicon (SONOS) memory, disk (e.g., floppy disk, hard drive, optical disk, magnetic disk, magneto-optical disk), or card (e.g., magnetic card, optical card), tape, cassette, or any other medium which can be used to store the desired information and which can accessed by computer 910. The embodiments are not limited in this context.

In one embodiment, for example, the computer 910 may include a system bus 921 that couples various system components including the memory unit 930 to the processing unit 920. A system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, and so forth. The embodiments are not limited in this context.

In various embodiments, the computer 910 may include various types of storage media. Storage media may represent any storage media capable of storing data or information, such as volatile or non-volatile memory, removable or non-removable memory, erasable or non-erasable memory, writeable or re-writeable memory, and so forth. Storage media may include two general types, including computer readable media or communication media. Computer readable media may include storage media adapted for reading and writing to a computing system, such as the computing system architecture 900. Examples of computer readable media for computing system architecture 900 may include, but are not limited to, volatile and/or nonvolatile memory such as ROM 931 and RAM 932. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, radio-frequency (RF) spectrum, infrared and other wireless media. Combinations of the any of the above should also be included within the scope of computer readable media.

In various embodiments, the memory unit 930 includes computer storage media in the form of volatile and/or non-volatile memory such as ROM 931 and RAM 932. A basic input/output system 933 (BIOS), containing the basic routines that help to transfer information between elements within computer 910, such as during start-up, is typically stored in ROM 931. RAM 932 typically contains data and/or program modules that are immediately accessible to and/or presently being operated on by processing unit 920. By way of example, and not limitation, FIG. 4 illustrates operating system 934, application programs 935, other program modules 936, and program data 937.

The computer 910 may also include other removable/non-removable, volatile/nonvolatile computer storage media. By way of example only, FIG. 4 illustrates a hard disk drive 940 that reads from or writes to non-removable, nonvolatile magnetic media, a magnetic disk drive 951 that reads from or writes to a removable, nonvolatile magnetic disk 952, and an optical disk drive 955 that reads from or writes to a removable, nonvolatile optical disk 956 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 941 is typically connected to the system bus 921 through a non-removable memory interface such as interface 940, and magnetic disk drive 951 and optical disk drive 955 are typically connected to the system bus 921 by a removable memory interface, such as interface 950.

The drives and their associated computer storage media discussed above and illustrated in FIG. 4, provide storage of computer readable instructions, data structures, program modules and other data for the computer 910. In FIG. 4, for example, hard disk drive 941 is illustrated as storing operating system 944, application programs 945, other program modules 946, and program data 947. Note that these components can either be the same as or different from operating system 934, application programs 935, other program modules 936, and program data 937. Operating system 944, application programs 945, other program modules 946, and program data 947 are given different numbers here to illustrate that, at a minimum, they are different copies. A user may enter commands and information into the computer 910 through input devices such as a keyboard 962 and pointing device 961, commonly referred to as a mouse, trackball or touch pad. Other input devices (not shown) may include a microphone, joystick, game pad, satellite dish, scanner, or the like. These and other input devices are often connected to the processing unit 920 through a user input interface 960 that is coupled to the system bus, but may be connected by other interface and bus structures, such as a parallel port, game port or a universal serial bus (USB). A monitor 991 or other type of display device is also connected to the system bus 921 via an interface, such as a video interface 990. In addition to the monitor 991, computers may also include other peripheral output devices such as speakers 997 and printer 996, which may be connected through an output peripheral interface 990.

The computer 910 may operate in a networked environment using logical connections to one or more remote computers, such as a remote computer 980. The remote computer 980 may be a personal computer (PC), a server, a router, a network PC, a peer device or other common network node, and typically includes many or all of the elements described above relative to the computer 910, although only a memory storage device 981 has been illustrated in FIG. 4 for clarity. The logical connections depicted in FIG. 4 include a local area network (LAN) 971 and a wide area network (WAN) 973, but may also include other networks. Such networking environments are commonplace in offices, enterprise-wide computer networks, intranets and the Internet.

When used in a LAN networking environment, the computer 910 is connected to the LAN 971 through a network interface or adapter 970. When used in a WAN networking environment, the computer 910 typically includes a modem 972 or other technique suitable for establishing communications over the WAN 973, such as the Internet. The modem 972, which may be internal or external, may be connected to the system bus 921 via the user input interface 960, or other appropriate mechanism. In a networked environment, program modules depicted relative to the computer 910, or portions thereof, may be stored in the remote memory storage device. By way of example, and not limitation, FIG. 4 illustrates remote application programs 985 as residing on memory device 981. It will be appreciated that the network connections shown are exemplary and other techniques for establishing a communications link between the computers may be used. Further, the network connections may be implemented as wired or wireless connections. In the latter case, the computing system architecture 900 may be modified with various elements suitable for wireless communications, such as one or more antennas, transmitters, receivers, transceivers, radios, amplifiers, filters, communications interfaces, and other wireless elements. A wireless communication system communicates information or data over a wireless communication medium, such as one or more portions or bands of RF spectrum, for example. The embodiments are not limited in this context.

Some or all of the business application system 100 and/or computing system architecture 900 may be implemented as a part, component or sub-system of an electronic device. Examples of electronic devices may include, without limitation, a processing system, computer, server, work station, appliance, terminal, personal computer, laptop, ultra-laptop, handheld computer, minicomputer, mainframe computer, distributed computing system, multiprocessor systems, processor-based systems, consumer electronics, programmable consumer electronics, personal digital assistant, television, digital television, set top box, telephone, mobile telephone, cellular telephone, handset, wireless access point, base station, subscriber station, mobile subscriber center, radio network controller, router, hub, gateway, bridge, switch, machine, or combination thereof. The embodiments are not limited in this context.

In some cases, various embodiments may be implemented as an article of manufacture. The article of manufacture may include a storage medium arranged to store logic and/or data for performing various operations of one or more embodiments. Examples of storage media may include, without limitation, those examples as previously described. In various embodiments, for example, the article of manufacture may comprise a magnetic disk, optical disk, flash memory or firmware containing computer program instructions suitable for execution by a general purpose processor or application specific processor. The embodiments, however, are not limited in this context.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:
1. A method, comprising:
receiving definitions for time members for a time dimension of a multidimensional data model, wherein a time member represents a specific instance of a characteristic of the time dimension;
assigning by a processor a monotonically increasing unique identifier to each time member, wherein an order- ing of the unique identifiers of each time member is preserved when an operation is performed on the unique identifiers;

generating a calendar with time members from the time dimension using the unique identifiers, wherein the calendar defines time dimension information for cells of a multidimensional data cube employing the multidimensional data model, and comprises at least one frequency instance and each frequency instance comprises at least one end marker and each end marker corresponds to an end value; and translating the calendar to a business dimension having at least one business dimension attribute and each business dimension attribute corresponding to a frequency instance, such that an end value of a day frequency instance becomes a business member of the business dimension and an end value of a different frequency instance becomes a value of the business dimension attribute.

2. The method of claim 1, comprising:

receiving definitions for a calendar pattern for the time members;

setting an is dirty property, an is new property, and an is extend property to false; and generating a new value for the business dimension attribute corresponding to a frequency instance, when the is dirty property is true for the frequency instance.

3. The method of claim 1, comprising receiving definitions for week distribution rules for the calendar.

4. The method of claim 1, comprising adding extra week's for the calendar.

5. The method of claim 1, comprising receiving calendar frequency selections for the calendar.

6. The method of claim 1, comprising receiving naming scheme definitions for frequency members for the calendar.

7. The method of claim 1, comprising receiving calendar view definitions for the calendar in the time dimension.

8. The method of claim 1, comprising generating a calendar with time members from the time dimension using the unique identifiers for a financial application program.

9. An article comprising a computer readable storage memory unit containing instructions that if executed enable a system to:

define time members for a time dimension of a multidimensional data model, wherein a time member represents a specific instance of a characteristic of the time dimension;

assign a monotonically increasing unique identifier to each time member, wherein an ordering of the unique identifiers of each time member is preserved when an operation is performed on the unique identifiers;

generate a calendar for an application program with time members from the time dimension using the unique identifiers, wherein the calendar defines time dimension information for cells of a multidimensional data cube employing the multidimensional data model, and comprises at least one frequency instance and each frequency instance comprises at least one end marker and each end marker corresponds to an end value; and translate the calendar to a business dimension having at least one business dimension attribute and each business dimension attribute corresponding to a frequency instance, such that an end value of a day frequency instance becomes a business member of the business dimension and an end value of a different frequency instance becomes a value of the business dimension attribute.

10. The article of claim 9, further comprising instructions that if executed enable the system to define a calendar pattern for the time members.

11. The article of claim 9, further comprising instructions that if executed enable the system to define week distribution rules for the calendar.

12. The article of claim 9, further comprising instructions that if executed enable the system to add extra weeks for the calendar.

13. The article of claim 9, further comprising instructions that if executed enable the system to select calendar frequencies for the calendar.

14. The article of claim 9, further comprising instructions that if executed enable the system to define a naming scheme for frequency members for the calendar.

15. The article of claim 9, further comprising instructions that if executed enable the system to create calendar views for the calendar in the time dimension.

16. An apparatus comprising a processor and a calendar application module to define and generate a calendar for an application program, the calendar application module to define time members for a time dimension of a multidimensional data model, wherein a time member represents a specific instance of a characteristic of the time dimension, assign, by the processor, a monotonically increasing unique identifier to each time member, wherein an ordering of the unique identifiers of each time member is preserved when an operation is performed on the unique identifiers, generate the calendar with time members from the time dimension using the unique identifiers, wherein the calendar defines time dimension information for cells of a multidimensional data cube employing the multidimensional data model and comprises at least one frequency instance and each frequency instance comprises at least one end marker and each end marker corresponds to an end value, and translate the calendar to a business dimension having at least one business dimension attribute and each business dimension attribute corresponding to a frequency instance, such that an end value of a day frequency instance becomes a business member of the business dimension and an end value of a different frequency instance becomes a value of the business dimension attribute.

17. The apparatus of claim 16, the calendar application module to define a calendar pattern for the time members.

18. The apparatus of claim 16, the calendar application module to select calendar frequencies for the calendar.

19. The apparatus of claim 16, the calendar application module to define a naming scheme for frequency members for the calendar.

20. The apparatus of claim 16, the calendar application module to create calendar views for the calendar in the time dimension.

* * * * *